(12) United States Patent
Schoen et al.

(10) Patent No.: US 12,214,377 B2
(45) Date of Patent: Feb. 4, 2025

(54) CONFORMAL COATING PROCESS WITH THICKNESS CONTROL

(71) Applicant: Precision Valve & Automation, Inc., Halfmoon, NY (US)

(72) Inventors: Jason Schoen, Clifton Park, NY (US); Jonathan Neal Urquhart, Saratoga Springs, NY (US); Frank Hart, Rexford, NY (US)

(73) Assignee: PRECISION VALVE & AUTOMATION, INC., Halfmoon, NY (US)

( * ) Notice: Subject to any disclaimer, the term of this patent is extended or adjusted under 35 U.S.C. 154(b) by 0 days.

(21) Appl. No.: 17/497,318

(22) Filed: Oct. 8, 2021

(65) Prior Publication Data

US 2022/0168776 A1 Jun. 2, 2022

Related U.S. Application Data

(60) Provisional application No. 63/120,428, filed on Dec. 2, 2020.

(51) Int. Cl.
*B05D 1/02* (2006.01)
*B05B 12/08* (2006.01)
*B05D 1/00* (2006.01)

(52) U.S. Cl.
CPC .............. *B05D 1/02* (2013.01); *B05B 12/084* (2013.01); *B05D 1/00* (2013.01)

(58) Field of Classification Search
CPC ...................................................... B05D 1/00
See application file for complete search history.

(56) References Cited

U.S. PATENT DOCUMENTS

| | | |
|---|---|---|
| 2010/0108256 A1 | 5/2010 | Roajanasiri et al. |
| 2018/0304293 A1 | 10/2018 | Orla-Jensen et al. |
| 2019/0039084 A1* | 2/2019 | Bourne .................. G01B 21/08 |

FOREIGN PATENT DOCUMENTS

| | | |
|---|---|---|
| CN | 101740046 A | 6/2010 |
| CN | 111465453 A | 7/2020 |
| EP | 3639936 A2 | 4/2020 |
| KR | 102163176 B1 | 10/2020 |
| WO | 2019094282 A1 | 5/2019 |

* cited by examiner

*Primary Examiner* — Nathan T Leong
(74) *Attorney, Agent, or Firm* — Schmeiser, Olsen & Watts LLP (57) ABSTRACT

A method for controlling a dispensing system is provided, including the steps of dispensing, by a dispensing device, a coating material onto a substrate according to a first dispensing operation, inspecting, by an inspection device integrated with the dispensing device, the coating material applied to the first substrate, and altering the first dispensing operation based on the inspecting so that the coating material is dispensed onto a subsequent substrate according to a second dispensing operation. An associated coating machine is also provided.

10 Claims, 5 Drawing Sheets

CONFORMAL COATING PROCESS WITH THICKNESS CONTROL

CROSS-REFERENCE TO RELATED APPLICATIONS

This application claims priority to and the benefit of U.S. Provisional Application No. 63/120,428, filed Dec. 2, 2020, and entitled "Conformal Coating Process with Thickness Control."

FIELD OF TECHNOLOGY

The following relates to embodiments of a conformal coating machine, and more specifically to embodiments of a conformal coating machine for controlling a thickness of an applied coating.

BACKGROUND

Conventional conformal coating thickness measurement is done manually offline or inline using optical inspection. Manual methods use wet film gages, eddy current meter, laser, confocal, or other sensors that are performed offline. Manual handling can introduce contamination, possible compromise to coating placement, or produce incorrect results. Optical inspection can be done inline or offline but needs to be calibrated to optical brightness of coating under blacklight for every coating batch and needs to compare against a "golden" sample.

SUMMARY

An aspect relates to a method for controlling a dispensing system comprising: dispensing, by a dispensing device, a coating material onto a substrate according to a first dispensing operation, inspecting, by an inspection device integrated with the dispensing device, the coating material applied to the first substrate, and altering the first dispensing operation based on the inspecting so that the coating material is dispensed onto a subsequent substrate according to a second dispensing operation.

In an exemplary embodiment, the first dispensing operation includes dispensing the coating material at a first flow rate, and the second dispensing operation includes dispensing the coating material at a second flow rate which is different than the first flow rate.

In an exemplary embodiment, the inspecting includes measuring a thickness of the coating material applied to the substrate, and/or detecting a placement of the coating material in one or more target areas of the substrate.

In an exemplary embodiment, altering the first dispensing operation includes adjusting at least one parameter of the dispensing device.

In an exemplary embodiment, the at least one parameter of the dispensing device being adjusted includes a pump speed, a fluid pressure, an orifice opening, a valve stroke, a travel speed, and a coating position.

In an exemplary embodiment, the inspecting occurs prior to the substrate exiting the dispensing system, while the substate is in a same or close to the same position within the dispensing system, after the dispensing.

In an exemplary embodiment, the inspection device and the dispensing device are both located within a same housing of the dispensing system, and the inspection device is attached to physically proximate the dispensing device.

Another aspect relates to a method for controlling a dispensing system comprising: dispensing a coating material onto a substrate received by the dispensing system, measuring a thickness of the coating material applied to the substrate with a sensor disposed proximate a dispensing device within the dispensing system, determining an error in the thickness of the coating material, adjusting at least one parameter of the dispensing system to correct the error, and performing a corrective action, in response to the adjusting.

In an exemplary embodiment, the error is determined by comparing the thickness measured by the sensor to a preset tolerance and determining that the thickness measured by the sensor exceeds a preset tolerance surrounding a desired thickness.

In an exemplary embodiment, the corrective action includes dispensing additional coating material onto the substrate and obtaining a subsequent thickness measurement, or ejecting the substrate from the dispensing system and dispensing the coating material onto a subsequent substrate entering the dispensing system.

Another aspect relates to a coating machine, comprising: a dispensing device configured to dispense a coating material onto a sequence of substrates moved through the coating system, an inspection device integrated with the dispensing device, the inspection device configured to perform an inspection of the coating material applied to at least one substrate of the sequence of substrates, and a controller configured to adjust at least one parameter of the coating machine based on the inspection by the inspection device.

In an exemplary embodiment, the inspection device is a spectral interference laser sensor integrated with the dispensing device.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

In brief overview, embodiments of the present invention relate to a coating machine that leverages sensor data to automatically adjust a coating process if an error is detected. The sensor measures a characteristic of the applied coating, such as a thickness of the applied coating, and sends the sensor data to a controller/computer for processing. The sensor data is processed to determine whether the applied coating is within an acceptable tolerance of a desired specification (e.g. desired thickness). If the controller/computer determines that the thickness of the applied coating exceeds the acceptable tolerance, the controller adjusts one or more parameters of the coating machine to reduce or increase an amount of coating material to be applied, thereby brining the thickness of the applied coating within the acceptable tolerance of the desired specification. The coating machine is configured to coat a sequence of substrates, and by leveraging the sensor data to automatically adjust the coating process, a number of substrates exposed to errors in the coating process are substantially reduced. In many cases, the error is detected, and associated adjustments are made prior to coating a subsequent substrate.

Advantageously, the sensor is disposed proximate to a dispensing device for more immediate error detection and corrective action. Instead of ejecting the substrate from the dispensing component of the coating machine for remote inspection of the applied coating material, the sensor located in the same vicinity as the dispensing device inspects the applied coating and sends the data for processing prior to the substrate leaving the vicinity of the dispensing device. In this way, any error can be detected much sooner than if the substrate was passed to another assembly line or remote component for inspection while another substrate is loaded in the coating machine. Quicker error detection means that the necessary adjustments to the coating machine are completed earlier in the coating process, which reduces delays in coating subsequent substrates and reduces the number of subsequent substrates being coated in error prior to the adjustment. Moreover, the proximal location of the sensor to the dispensing device allows for touch-ups or additional dispensing to the current substrate, eliminating the need to discard the substrate.

Figure 1:
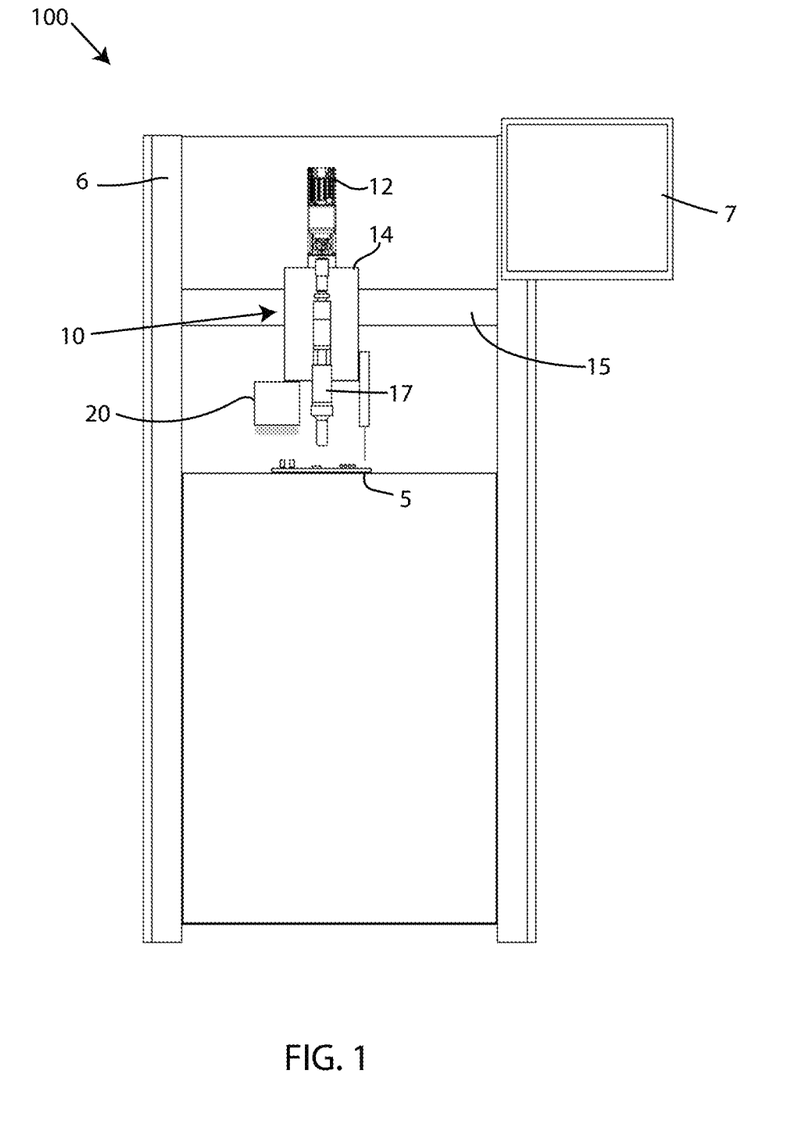
FIG. 1 depicts a schematic view of a coating machine, in accordance with embodiments of the present invention.

Referring now to the drawings, FIG. 1 depicts a coating machine 100, in accordance with embodiments of the present invention. The coating machine 100 is a machine configured to dispense, apply, or otherwise coat a substrate 5 with a coating material. In an exemplary embodiment, the coating machine 100 is a conformal coating machine configured to apply a conformal coating to a substrate 5, such as a printed circuit board. The coating machine 100 is defined by a housing 6 made up of a plurality of frame members, panels, and access points. The panels attached to the frame may be a combination of both solid panels and see-through panels, such as Plexiglas®, glass, plastic, and the like, to allow operational viewing. Moreover, coating machine 100 is a discrete unit but other discrete units having other functions (e.g. curing) can be coupled to the coating machine 100 to complete the conformal coating process.

The housing 6 has in internal region containing both a dispensing device 10 and an inspection device 20 and is suited for receiving a sequence of substrates 5 as part of a coating process; there could be a single substrate within the housing 6 or more than one discrete substrates located within the housing 6 for receiving a coating material. Optionally, the coating machine 100 includes a display unit 12 for displaying operational data, such as flow pattern characteristics, sequences, status updates, output volume, component data, and the like.

The dispensing device 10 located within the housing 6 of the coating machine 100 is configured to dispense the coating material onto a surface of the substrate 5 or a sequence of substrates moved through the coating machine 100; the entire surface of the substrate 5 can be coated or one or more target areas of the substrate 5 can be coated. The coating material may be a fluid, a liquid, or other viscous material suitable for coating electronics or other components needing proper coating. The dispensing device 10 includes a dispenser 17 to dispense the coating material onto the substrate 5. The dispenser 17 is operably attached to an end effector 14 located within the coating machine 100. The end effector 14 can be used with an X-axis actuator, a Y-axis actuator, and/or a Z-axis actuator for achieving movement in one or more axes. The machine housing or other component element(s) receiving the end effector may utilize a robotic platform to perform automated tasks with accuracy, precision, and repeatability. For example, the machine may be a Gantry robot having a plurality of principal axes (Cartesian coordinates) controlling linear motion, wherein the horizontal member(s) may be supported at both ends. The machine may also be any robotic manipulator such as a selective compliant assembly robot arm (SCARA) system, linear robot, multi-axis robot arm system, and the like. However, an embodiment of the machine will be described as utilizing a Gantry robot for exemplary purposes. The end effector 14 may refer to any device(s) attached to a X, Y, Z or other axis of movement to perform a variety of tasks, such as dispensing, picking and placing, routing, coating, and the like. For instance, end effector 14 is capable of rotation about the Z axis, and may move left and right along the Y axis by sliding along the Y axis actuator, and move back and forth along the X axis by sliding with the Y axis actuator as it slides along the X axis actuator. Additionally, the end effector 14 may move up and down on the Z-axis by sliding along the Z-axis actuator. The X-axis actuator, the Y-axis actuator, and the Z-axis actuator may be a ball screw slide, linear motion slide, a linear actuator, and the like. In some embodiments, the end effector 14 may also allow for a tilting of the dispenser 17 to dispense the coating material at various angles with respect to the substrate 5.

The dispenser 17 may be referred to as a valve or more particularly a dispensing valve and may be a device, an apparatus, valve, mixing valve, two-part spray head, dual-component spray valve, or any component or system that is configured to deliver a fluid on a surface, edge, and/or perimeter of a substrate. The dispenser 17 is operably connected to a regulator and a fluid supply. In an exemplary embodiment, the regulator 12 and the fluid supply (not shown) are in fluid communication with the dispenser 17. The regulator 12 and other components of the dispenser 17 are mechanically connected in a manner that facilitates the dispensing and regulating of a fluid from the dispenser 17. The regulator 12 controls, adjusts, regulates, etc. a pressure of the coating material being dispensed from the dispenser 17. Embodiments of the regulator 12 may be a pneumatically controlled regulator or an electropneumatical regulator. Further, a pump is associated with the fluid supply and is operated to effectuate a change in pump output. For instance, a pump, such as a gear pump, may be used to increase or decrease a pump speed through the dispenser 17.

In one embodiment, progressive pumps with an integrated spray cap for selective application of reactive materials can also be used with the dispenser 17. For instance, the dispenser 17 may selectively coat a circuit board (e.g. coat some areas of the circuit board and not others) by spraying a reactive material, mixed by a mixing element of the dispenser, onto the target substrate, wherein the reactive material is atomized prior to exiting the nozzle. An integrated air cap allows for a control of the atomized reactant material for selective applications.

With continued reference to FIG. 1, the inspection device 20 is integrated with the dispensing device 10. The inspection device 20 being integrated with the dispensing device 10 means that the inspection device 20 is disposed close enough to the dispensing device 20 so that an inspection of the applied coating by the dispensing device 10 can be performed by the inspection device 20 without requiring a movement of the substrate 5. For example, the inspecting occurs while the substate 5 is in a same position within the coating machine 100, after the dispensing. While movement of the substrate 5 is not required for inspection by the inspection device 20, the substrate 5 can be moved, repositioned, or otherwise manipulated within the housing 6 after dispensing of the coating material and prior to the inspecting. The substrate 5 may also be moved during the inspection by the inspection device 5. In this way, the inspecting occurs prior to the substrate 5 exiting the coating machine 100 for more immediate error detection and corrective action, as described supra.

Various configurations of the coating machine 100 exist to integrate the inspection device 20 to the dispensing device 17 within the coating machine 100. As shown in FIG. 1, the inspection device 20 is coupled to the dispensing device 10 within the housing 6 so that each component is located within the housing 6 of the coating machine 100. The inspection device 20 is physically attached to the end effector 14, which is a part of the dispensing device 10. Movement of the end effector 14 results in movement of both the inspection device 20 and the dispenser 17. In another embodiment, the inspection device 20 can be attached to the end effector 14 via a bridge or linking element, such as a bar or plate attached to the end effector 14 on one end and the inspection device 20 on the other end. In another embodiment, the coating machine 100 includes a second end effector within the housing 6 to which the inspection device 20 is attached; the second effector can be controlled similar to end effector 14 and can be used to movably position the inspection device 20 with respect to the substrate 5 and/or the dispensing device 10. In another embodiment, the inspection device 20 can be mounted the frame of the coating machine 100 at a location within the housing 6 to inspect the applied coating dispensed by the dispensing system 10. Other configurations may be used to dispose the inspection device 20 proximate the dispensing device 10. Each configuration integrates the inspection device 20 with the dispensing device 10 so that the applied coating material can be inspected by the inspection device 20 without requiring an ejection of the substrate 5.

The inspection device 20 is one or more sensors configured to perform an inspection of the coating material applied to at least one substrate of the sequence of substrates. For example, the inspection device 20 measures a thickness of the coating material applied to the substrate 5 and/or detects a placement of the coating material in one or more target areas of the substrate 5. The data captured by the inspection device 20 is transmitted to a controller coupled to the coating machine 100, the dispensing device 10, and the inspection device 20, which is used to make adjustments to the coating machine 100, as described in greater detail infra. In an exemplary embodiment, the inspection device 20 is a spectral interference laser sensor capable of providing accurate measurements of the thickness of the applied coating material in one or more target areas of the substrate 5, or the entire surface of the substrate. Other embodiments of the inspection device 20 include confocal laser, a displacement laser, 3D scanner, and the like.

Figure 2:
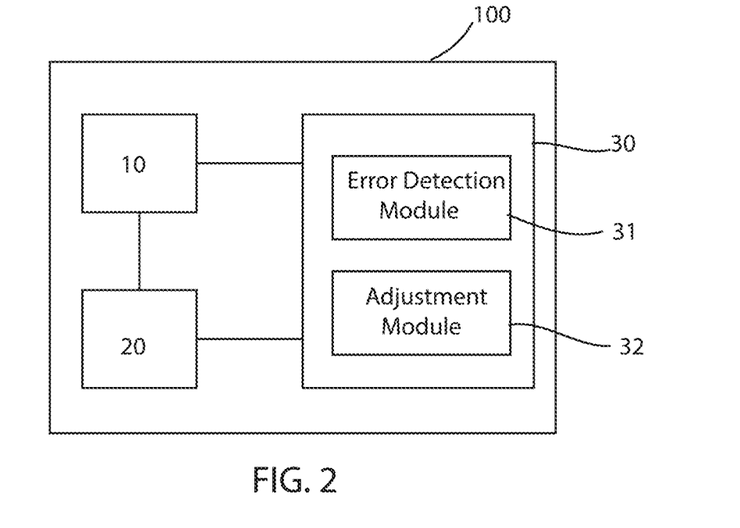
FIG. 2 depicts a block diagram of a first embodiment of the coating machine, in accordance with embodiments of the present invention.

Referring now to FIG. 2, the coating machine 100 includes a controller 30. The controller 30 is configured to adjust at least one parameter of the coating machine 100 based on the inspection by the inspection device 20. Sensor data is transmitted to the controller 30 from the inspection device 20 to be analyzed for taking corrective actions impacting a dispensing operation of the dispenser 17. The controller 30 generates and sends control signals to one or more components of the coating machine 100 that impact or otherwise modify the dispensing operation of the dispenser 17, based on the received sensor data from the inspection device. The control signals issued by the controller 30 adjust at least one parameter of the dispensing device 10 and/or the coating machine 100. The at least one parameter of the dispensing device 10 and/or coating machine 100 includes a pump speed, a fluid pressure, an orifice opening, a valve stroke, a travel speed, and a coating position. A single parameter can be adjusted or a combination of parameters can be adjusted by the controller. As example, the controller 30 can increase the pump speed of the dispensing device 10 to deliver a volume of coating material to the dispensing device 10 at faster intervals, increase the pump speed of the dispensing device 10 to deliver a volume of coating material to the dispensing device 10 at slower intervals, reduce the orifice opening of a nozzle of the dispensing device 10 to reduce a flow rate of the coating material to be dispensed from the dispenser 17, increase the orifice opening of the nozzle of the dispensing device 10 to increase the flow rate of the coating material to be dispensed from the dispenser 17, decrease a travel speed of the end effector 14 so that a larger amount of coating material is applied per pass of a target area of the substrate, and/or increase the travel speed of the end effector 14 so that a smaller amount of coating material is applied per pass of the target area of the substrate. Other adjustments can be made to the dispensing device 10, end effector 14, the dispenser 17, components associated with the dispenser 17, and the coating machine 100 that will impact the thickness of the coating material applied to the substrate.

The controller 30 includes an error detection module 31 and an adjustment module 32. A "module" refers to a hardware based module, software based module or a combination of hardware and software. Embodiments of hardware based modules include self-contained components such as chipsets, specialized circuitry and one or more memory devices, while a software-based module is part of a program code or linked to the program code containing specific programmed instructions, which are loaded in the memory device of a computer system associated with the coating machine 100. A module (whether hardware, software, or a combination thereof) is designed to implement or execute one or more particular functions or routines. The error detection module 31 includes one or more components of hardware and/or software program code for detecting an error between a desired coating property (e.g. desired thickness) and an actual coating property (e.g. measured thickness). In an exemplary embodiment, the error detection module 31 compares the thickness measured by the inspection device 20 to a preset tolerance. The preset tolerance is a ±range that is an acceptable deviation from the desired thickness, or other coating property being measured. The error detection module 31 determine whether the thickness measured by the inspection device 20 exceeds the preset tolerance surrounding a desired thickness. If the error detection module 31 determines that the measured coating property does not exceed the preset tolerance, then no adjustments to the coating machine 100 are required. If the error detection module 31 determines that the measured coating property exceeds the preset tolerance, then the adjustment module 32 calculates the necessary adjustments to the coating machine 100 required to reduce the deviation from the desired coating property. Once the necessary adjustments are calculated (e.g. orifice opening of the nozzle needs to be reduced, travel speed of the end effector needs to be increased, etc.), the adjustment module 32 generates command signals and sends the command signals to the components of the coating machine 100 to effectuate the physical changes to the mechanical components of the coating machine 100.

Figure 3:
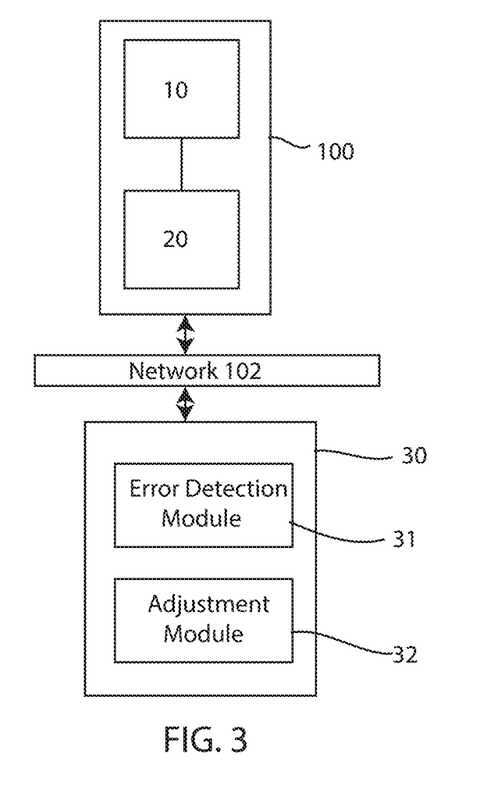
FIG. 3 depicts a block diagram of a second embodiment of the coating machine, in accordance with embodiment of the present invention.

The controller 30 is coupled to the components of the coating machine 100 via a data bus line, as shown in FIG. 2. However, the controller 30 can also be connected to the coating machine 100 and components thereof over a network 2, as depicted in FIG. 3. The network 2 refers to a group of two or more computer systems linked together. Network 2 may be any type of computer network known by individuals skilled in the art. Examples of computer network 2 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 2 may be a peer-to-peer network in some embodiments, wherein in other embodiments, the network 2 may be organized as a client/server architecture.

Figure 4:
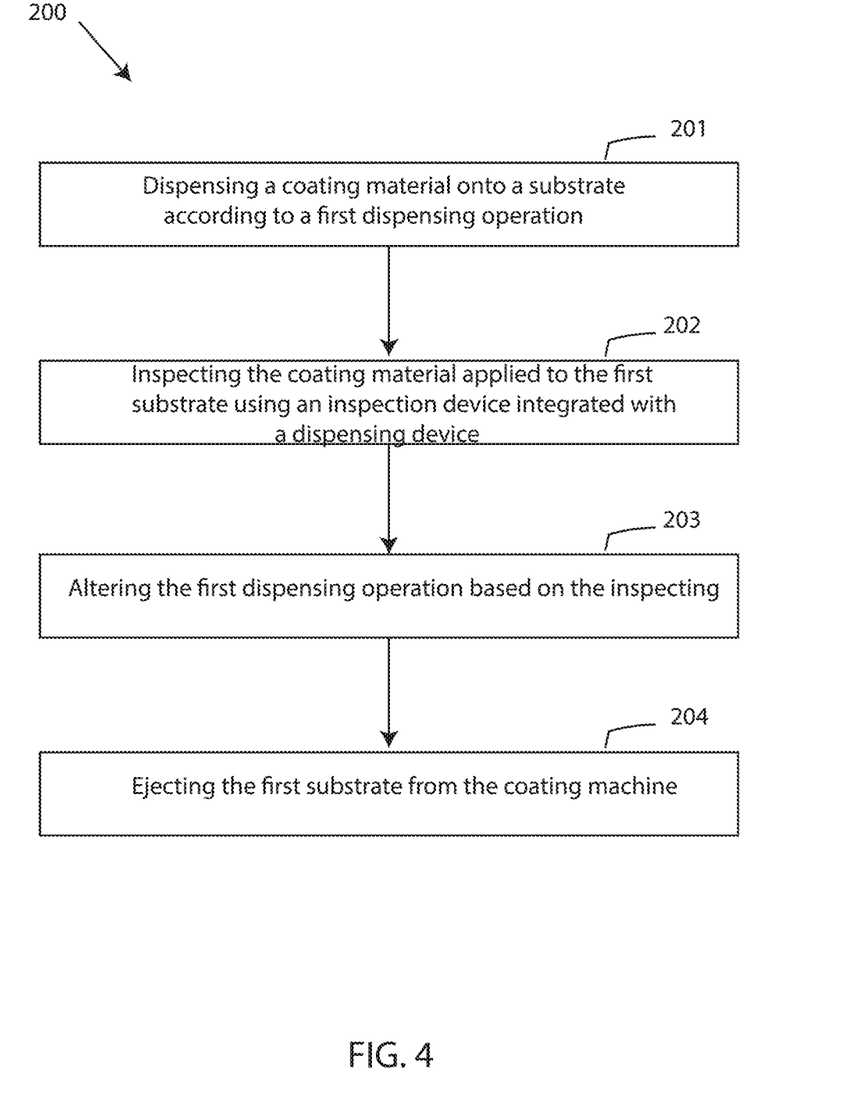
FIG. 4 depicts a flow chart of a method for controlling the coating machine, in accordance with embodiments of the present invention.

A method 200 for controlling the coating machine 100, or a dispensing system, will now be described with reference to FIG. 4. At step 201, the dispensing device 10 dispenses a coating material onto a first substrate in a sequence of substrates to be moved through the coating machine, according to a first dispensing operation. The first dispensing operation is a programmed dispensing of coating material onto the substrate 5 to achieve a desired coating thickness with initial coating machine/dispensing device parameters set accordingly; a combination of pump speed, orifice opening, robot travel speed, and flow rate can be used to achieve a specific coating thickness. For example, the first dispensing operation sets a pump speed value, an orifice opening value, a robot travel speed value, and a flow rate value to achieve a coating thickness of 125 microns (~0.005") on a substrate. The coating material is dispensed onto the substrate according to the first dispensing operation. At step 202, the inspection device 20 inspects the coating material applied to the substrate 5 by measuring the coating thickness of the applied coating material. A spectral interference laser sensor measures the thickness of the applied coating material and transmits the sensor data to the controller. The inspecting step occurs prior to the first substrate exiting the dispensing system; the first substrate as used herein does not necessarily mean the first substrate in the sequence of substrates but the first substrate to be inspected. At step 203, the first dispensing operation is altered based on the inspecting so that the coating material is dispensed onto a subsequent substrate according to a second dispensing operation. The controller processes the sensor data to determine if there is an error in the first dispensing operation. For example, the controller determines whether the measured coating thickness deviates from the desired coating thickness beyond a preset tolerance. In the event of an error detection, one or more parameters of the coating machine are adjusted to create a second dispensing operation. The second dispensing operation is a programmed dispensing of coating material onto the substrate 5 to achieve the desired coating thickness with updated and/or modified coating machine/dispensing device parameters; a combination of pump speed, orifice opening, robot travel speed, and flow rate can be used to achieve a specific, modified coating thickness. For example, the second dispensing operation sets a pump speed value, an orifice opening value, a robot travel speed value, a flow rate value, in which one or more of these values varies from the first dispensing operation, to achieve a coating thickness of approximately 75 microns (~0.003") on the substrate. At step 204, the first substrate is either ejected from the coating machine and a subsequent substrate is coated according to the second dispensing operation, or the first substrate is touched up to achieve the desired thickness and then ejected from the coating machine.

Figure 5:
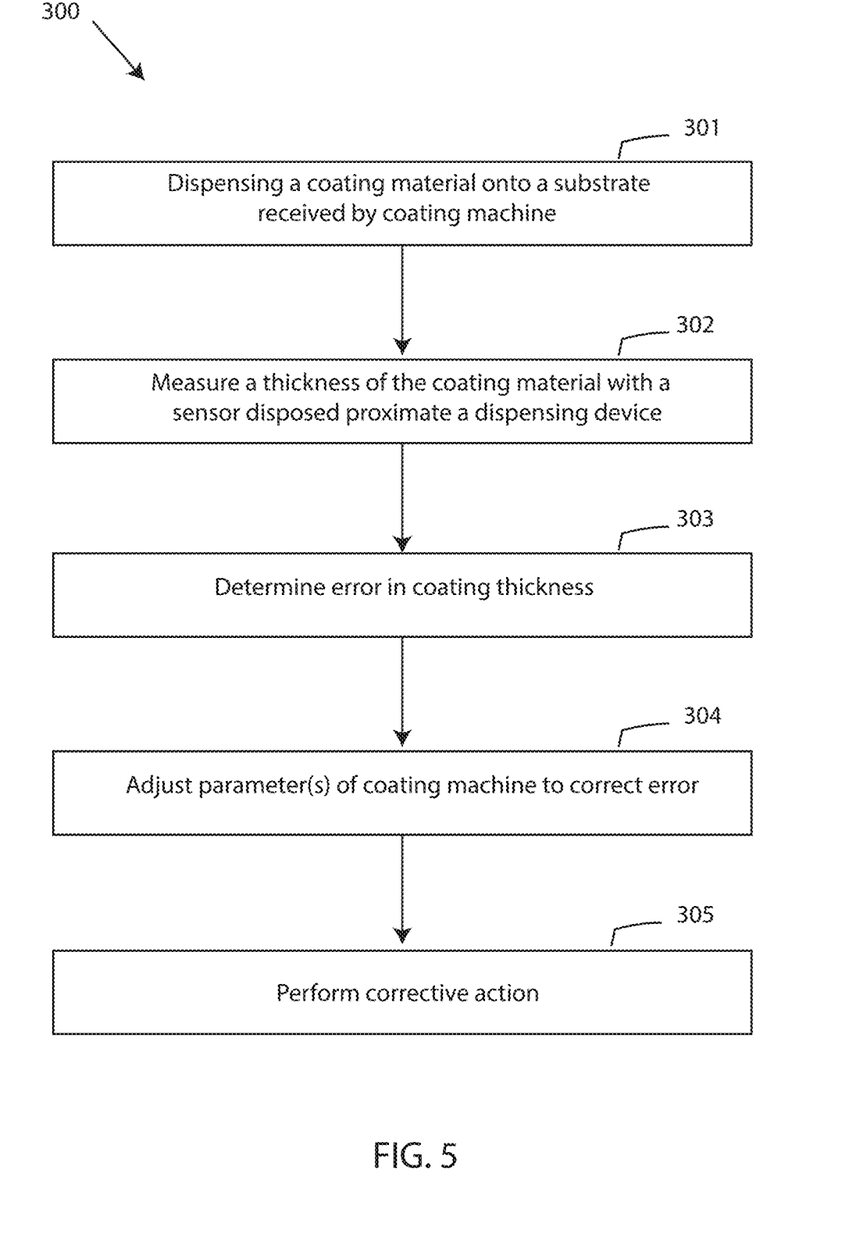
FIG. 5 depicts a flowchart of another method for controlling the coating machine, in accordance with embodiments of the present invention.

FIG. 5 depicts a flow chart of a method 300 for controlling a coating machine. At step 301, a coating material is dispensed onto a substrate received by the coating machine. At step 302, a thickness of the coating material applied to the substrate is measured with a sensor disposed proximate a dispensing device within the coating machine. At step 303, an error in the thickness of the coating material is determined. At step 304, at least one parameter of the dispensing system is adjusted to correct the error. At step 305, a corrective action is performed in response to the adjusting. In one embodiment, the corrective action is dispensing additional coating material onto the substrate and obtaining a subsequent thickness measurement according to the previous steps. In another embodiment, the corrective action includes ejecting the substrate from the dispensing system and dispensing the coating material onto a subsequent substrate entering the dispensing system.

Figure 6:
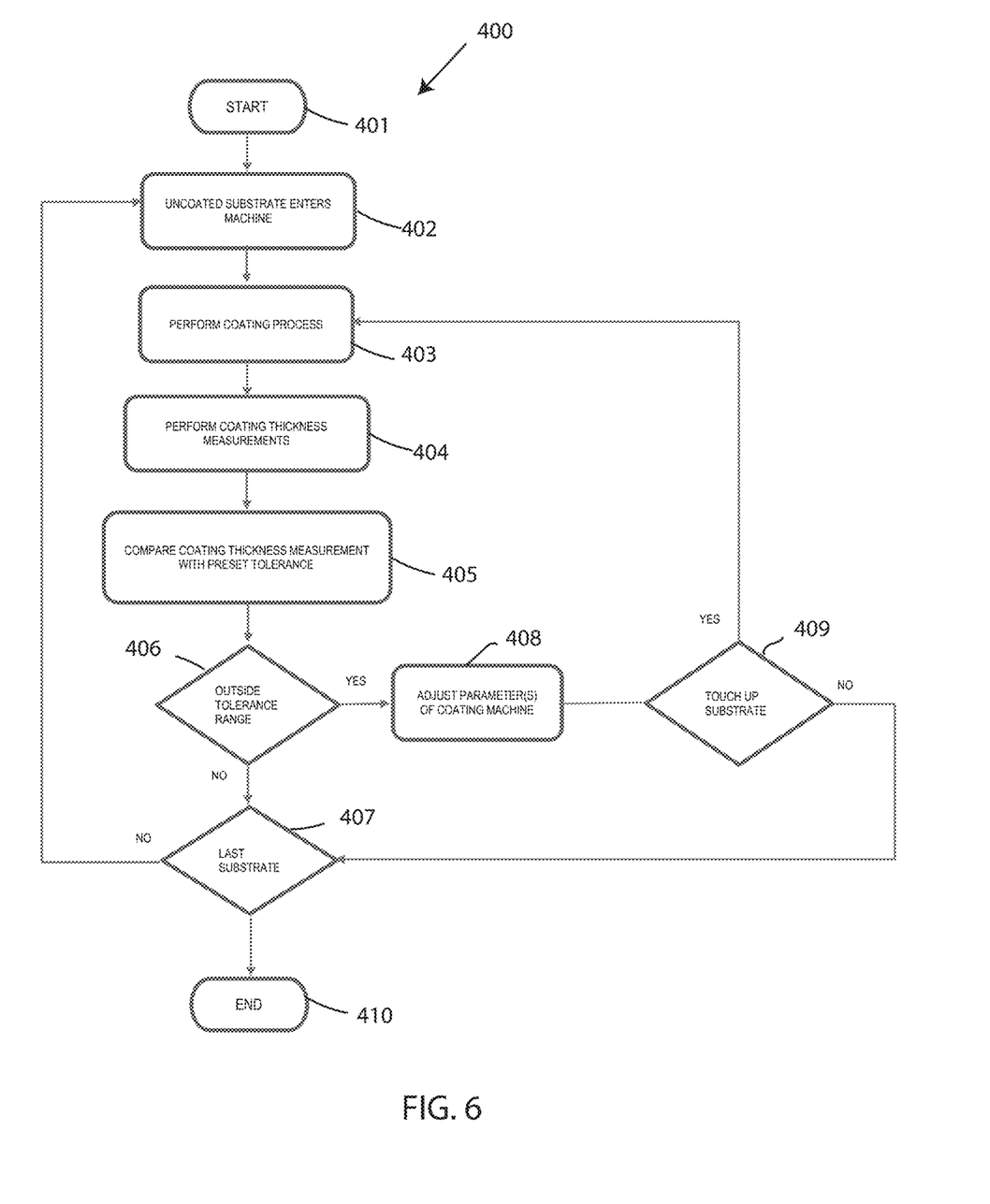
FIG. 6 depicts a flowchart of another method for controlling the coating machine, in accordance with embodiments of the present invention.

FIG. 6 depicts a more detailed flow chart of a method 400 of a closed loop thickness control. At step 401, the coating process is started. At step 402, an uncoated substrate enters the coating machine. At step 403, a coating process is performed to coat the uncoated substrate. At step 404, coating thickness measurements are performed. At step 405, the coating thickness measurement is compared with a preset tolerance. Step 406 determines whether the difference between the measured thickness and the desired thickness is outside a tolerance range. If no, step 407 determines whether the substrate is the last substrate in the sequence of substrates of the coating process. If the measured substrate is the last substrate in the sequence, the coating process is ended. If the measured substrate is not the last substrate in the sequence, the method 400 returns to step 401. If yes to step 406, step 408 adjusts one or more parameter of the coating machine. Step 409 determines whether the measured substrate should be touched-up (e.g. add additional coating material to one or more target areas). If yes, then the coating process returns to step 403. If no, the coating process proceeds to step 407. The coating process ends at step 410.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A method for controlling a dispensing system comprising:
   first dispensing, by a dispensing device, a coating material onto a first substrate of a sequence of substrates according to a first dispensing operation;
   first inspecting, by an inspection device physically attached to the dispensing device, the coating material applied to the first substrate, wherein movement of the dispensing device results in movement of the inspection device, wherein the first inspecting includes measuring a thickness of the coating material and comparing the thickness to a preset tolerance surrounding a desired thickness of coating material;
   altering the first dispensing operation based on determining that the thickness exceeds the preset tolerance so that the coating material is dispensed onto a second substrate according to a second dispensing operation, wherein the second substrate immediately follows the first substrate in the sequence;
   ejecting the first substrate from the dispensing system;
   second dispensing the coating material on the second substrate according to the second dispensing operation;
   second inspecting, by the inspection device, the coating material applied to the second substrate, wherein the second inspecting includes measuring a thickness of the coating material applied to the second substrate and comparing the thickness to the preset tolerance; and
   altering the second dispensing operation if the thickness of the coating material applied to the second substrate exceeds the preset tolerance so that the coating material is dispensed onto a third substrate according to a third dispensing operation, wherein the third substrate immediately follows the second substrate in the sequence, or dispensing the coating material on the third substrate according to the second dispensing operation;
   wherein the first dispensing operation, the second dispensing operation, and the third dispensing operations are different from each other.

2. The method of claim 1, wherein the first dispensing operation includes dispensing the coating material at a first flow rate, and the second dispensing operation includes dispensing the coating material at a second flow rate which is different than the first flow rate.

3. The method of claim 1, wherein the first inspecting and the second inspecting includes detecting a placement of the coating material in one or more target areas of the substrate.

4. The method of claim 1, wherein altering the first dispensing operation includes adjusting at least one parameter of the dispensing device.

5. The method of claim 1, wherein the at least one parameter of the dispensing device includes a pump speed, a fluid pressure, an orifice opening, a valve stroke, a travel speed, and a coating position.

6. The method of claim 1, wherein the first inspecting occurs prior to the first substrate exiting the dispensing system, and the second inspecting occurs after the first substrate exits the dispensing system and before the second substrate exits the dispensing system.

7. The method of claim 1, wherein the first inspecting occurs while the first substate is in a same position within the dispensing system, after the first dispensing.

8. The method of claim 1, wherein the inspection device and the dispensing device are both located within a same housing of the dispensing system.

9. A method for controlling a dispensing system comprising:
   dispensing a coating material onto a first substrate received by the dispensing system;
   measuring a thickness of the coating material applied to the first substrate with a sensor physically attached to a dispensing device within the dispensing system, wherein movement of the dispensing device results in movement of the inspection device;
   determining an error in the thickness of the coating material, wherein determining the error includes comparing the thickness measured by the sensor to a preset tolerance and determining that the thickness measured by the sensor exceeds a preset tolerance surrounding a desired thickness of coating material;
   adjusting at least one parameter of the dispensing system to correct the error;
   performing a corrective action, in response to the adjusting;
   ejecting the first substrate to receive a second substrate in a sequence of substrates, and in response to the ejecting, dispensing the coating material onto the second substrate and measuring a thickness of the coating material applied to the second substrate;
   wherein, for each substrate of the sequence of substrates to enter the dispensing system, a measuring step is performed to determine whether an adjustment to the at least one parameter is required, until a last substrate in the sequence.

10. The method of claim 9, wherein the corrective action includes dispensing additional coating material onto the first substrate.

* * * * *